Feb. 2, 1943.                    W. E. GORDON                    2,309,729
                           MOLDING OF POLYMERIC MATERIALS
                              Filed Sept. 30, 1938
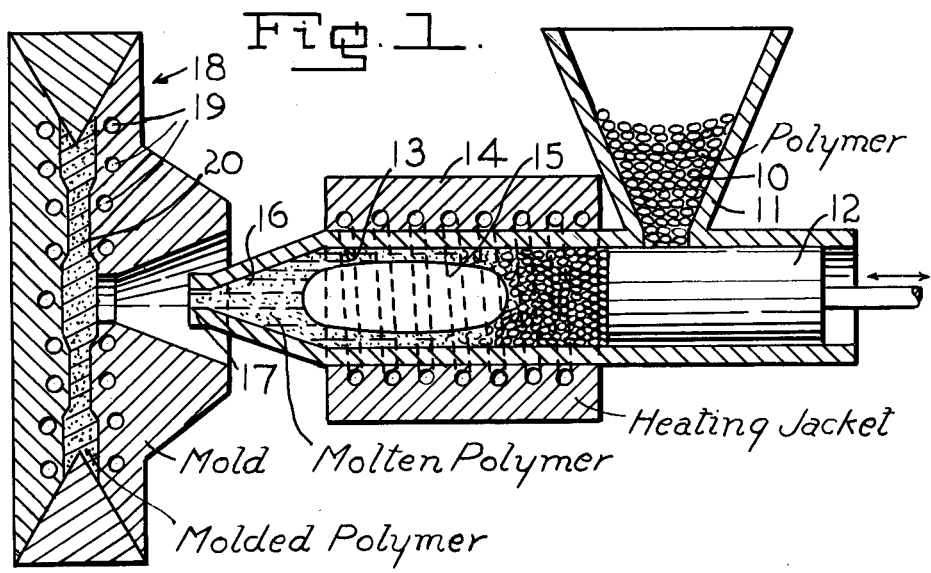
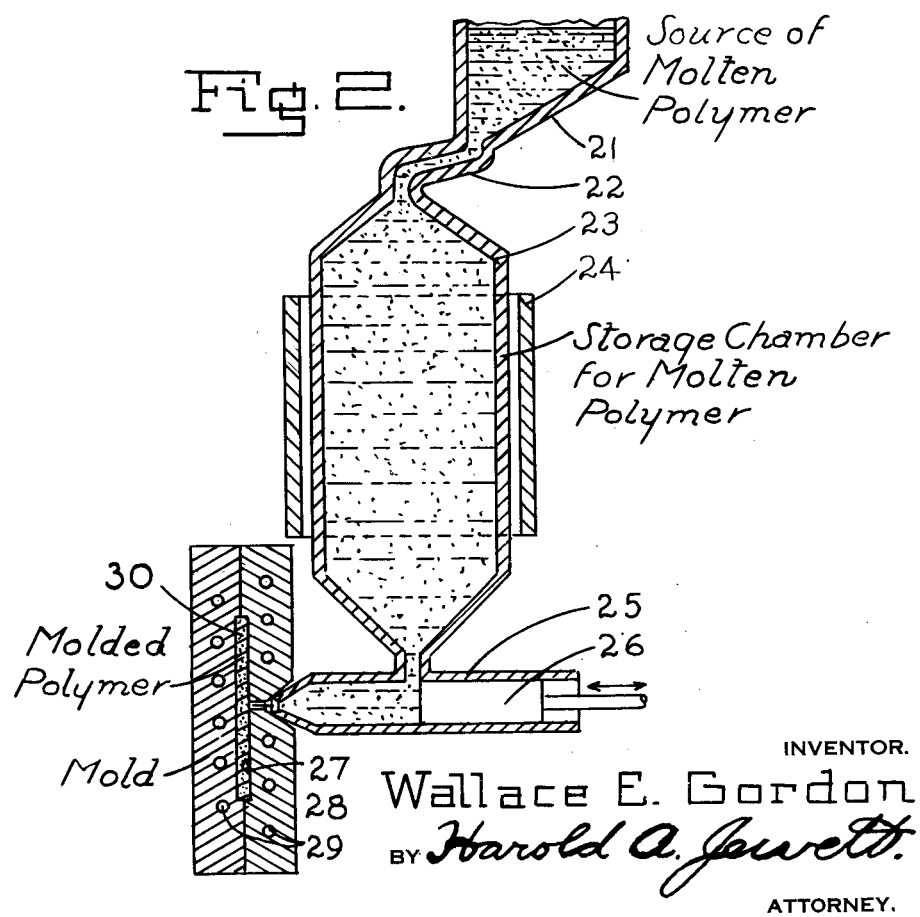
INVENTOR.
Wallace E. Gordon
BY Harold A. Jewett
ATTORNEY.

Patented Feb. 2, 1943

2,309,729

UNITED STATES PATENT OFFICE 2,309,729

MOLDING OF POLYMERIC MATERIALS

Wallace E. Gordon, Wilmington, Del., assignor to E. I. du Pont de Nemours & Company, Wilmington, Del., a corporation of Delaware Application September 30, 1938, Serial No. 232,679

1 Claim. (Cl. 18—55)

This invention relates to the art of molding, and more particularly to improvements in the manufacture of shaped articles by molding.

Heretofore, differentiation between the processes of die casting and injection molding has been principally based upon the fact that the former utilizes metals and the latter thermoplastic organic substances, and that the major operating differences between these two processes arise from the physical properties of the two classes of materials to be handled. Otherwise, the processes are identical in that each operates according to a cycle consisting of the steps of rendering a material fluid, forcing it through a nozzle into a mold by the application of high pressures upon said material, causing the material to fill the mold, cooling the material to the solid state within the mold, opening the mold and ejecting the formed article. Metals, on the one hand, possess sharp melting points, at which they are converted directly from crystalline solids to true heat stable liquids of relatively low viscosity, while thermoplastic substances, such as the common plastics, are non-crystalline materials, converted from the solid to a sensibly plastic state over a range of fifty to one hundred degrees centigrade, above the initial softening point. These so-called plastics are limited in their thermal stability and consequently exposure to temperatures required for ready injection is reduced to a minimum in the injection molding process. The granular molding composition is fed to an injection chamber and pressure alternately applied to the contents during the molding cycle in order to force the charge into contact with heating elements and inject the heat-softened portion through the nozzle into the mold. Therefore, the molding composition is passed through the nozzle substantially as fast as it becomes sufficiently plastic under the conditions of temperature and pressure employed and, once in the mold, is rapidly chilled.

Numerous types of materials have been described for use in the manufacture of shaped articles by injection molding. Most of these materials, however, are subject to limitations in practice, or not wholly suited to the process. For example, many of the so-called thermoplastics are deleteriously affected, as evidenced by discoloration, by the temperatures required for their injection molding. Polystyrene is free from this objection and appears to possess properties which permit its ready injection, but the molded articles are frequently marred by crazing. Articles molded from thermosetting resins are chiefly attractive because of their infusibility, but must be injection molded by a process which combines a chemical reaction with a physical process, thereby lengthening and complicating the molding cycle through the introduction of a curing step. Finally, it may be mentioned that modification of the existing types of injection molded plastics in order to produce, for example, articles of particular stiffness, hardness or mechanical strength is limited. As all materials heretofore used in the injection molding process are plastics, they do not possess the sharp melting point characteristics of crystalline solids, and therefore in the molding process are only softened sufficiently to permit plastic flow into the mold under 500–20,000 lbs./sq. in. pressure. This statement applies as well to the so-called thermosetting resins. In view of the range of temperature over which softening of the resin occurs, it is possible to vary the temperature of molding widely within this range, provided adequate pressure is applied to produce flow of the plastic into the mold. Finally, it may be said that materials heretofore available for injection molding are primarily non-crystalline materials which are converted from the solid to a sensibly plastic state over a range of 50–100° C.

In the case of die-casting with metals, it is possible to take advantage of their thermal stability by maintaining a molten reservoir of material and regularly drawing upon such a reservoir for the required charge of melt to supply an intermediate pressure chamber or to be injected directly into the mold. Such a process, which is not limited by the rate at which a given charge of material may be fused, lends itself to extremely rapid operation of a more continuous nature. However, the process of die-casting has been largely limited to low-melting alloys or metals, such as aluminum, zinc or tin, and of course has been wholly unsuitable for use with common plastics because of their thermal instability under the conditions of extended exposure to the temperatures required for their use in this process.

This invention has as an object the injection molding of polymeric crystalline material which yields improved products and which overcomes the above mentioned disadvantages of resinous or cellulosic materials in this type of molding. A further object is the manufacture of improved articles by a method not previously applied to organic materials. A still further object is an improved method for making useful or ornamental shaped articles of improved toughness or durability. Other objects will be apparent hereinafter.

I have now found that crystalline synthetic linear polymers may be satisfactorily injection molded to articles possessing unusual properties of toughness and strength. These polymers are thermally stable in the absence of oxygen well above the temperatures required for molding and may be modified by various agents in order to produce compositions of special properties, without substantially altering the inherent desirable characteristics of the polymers themselves. Moreover, as described below, these polymers possess sharp melting points, resulting in an abrupt change from the solid to the liquid state. Therefore, through the use of such polymers in the injection molding process, shorter cycles of operation are possible in that the material, once in the mold, hardens more rapidly and hence may be ejected more promptly.

The second object is accomplished through the use of a die-casting process in molding crystalline synthetic linear polymers. The application of this process, which consists essentially of liquefying the polymer by heat and supplying it so liquefied from a reservoir to the nozzle of an automatic molding machine, is uniquely adaptable to such polymers since other organic molding compositions suffer decomposition when maintained in a reservoir at temperatures producing the fluidity of the charge required by the process. Furthermore, it is doubtful whether many of the common thermoplastics could be raised to temperatures producing the required fluidity without suffering decomposition or depolymerization. While shaped metal articles prepared by die-casting are frequently more brittle or otherwise mechanically weaker than articles formed of the same metals by other fabricating procedures, objects produced by this process from crystalline synthetic linear polymers are comparable in all their physical properties with the same polymers shaped by other processes.

In the accompanying drawing:

Figure 1 is a view partly in section of a type of apparatus generally suitable for the practice of the invention; and Figure 2 is a diagrammatic sketch of a more special type of apparatus suitable for the practice of certain preferred forms of the invention.

Referring particularly to Figure 1:

The synthetic linear polymer, in the form of suitably sized pieces 10, is fed into a hopper 11. The piston 12 then is moved back, i. e. to the right (from the position shown in the drawing), thus permitting the pieces of polymer to enter the heating chamber 13, which is heated by the insulated jacket 14. Next, the piston is moved forward, i. e. to the left (into the position shown in the drawing), thus forcing the polymer past a stationary torpedo 15, which spreads the polymer close to the heating jacket so that the polymer, after being melted, is forced, as at 16, toward and into the nozzle 17. This nozzle is engaged with a demountable mold 18, suitably cooled as by water circulated through the conduits 19. Further movement of the piston forces the molten polymer to fill the mold, as at 20. Upon solidification of the polymer the mold is demounted, the molded article discharged, and the apparatus reassembled for repetition of the foregoing operations.

Referring particularly to Figure 2:

The chamber 21, closeable at its upper end to permit the development of pressure or to facilitate the maintenance of an inert atmosphere, is employed for the preparation of the polymer from suitable starting ingredients, or for the melting down of pre-formed polymer. In either case the polymer in the chamber, upon being heated to liquefaction therein, is passed through connection 22 to a storage chamber 23. The heating jacket 24 serves to maintain the storage chamber and its molten contents at the desired temperature. Molten polymer is supplied from the storage chamber 23 to the cylinder 25, and then is forced by the ram 26 into the cavity 27 of the closed mold 28. The mold is suitably cooled, as by water circulated through the conduits 29. Upon solidification of the polymer, as at 30, the molded article is removed from the mold, escape of molten polymer from the storage chamber being prevented, meanwhile, by any suitable valve means (not shown).

It may be mentioned that the particular apparatus shown in the foregoing Figures 1 and 2, per se, constitutes no part of this invention.

Before describing in detail the preparation of molded articles from crystalline synthetic linear polymers by the process of this invention, further reference is made to the polymers themselves. As indicated in Patents 2,071,250 and 2,071,253 and in application Serial Number 136,031, now U. S. Patent 2,130,948, filed April 9, 1937 by W. H. Carothers, "Crystalline synthetic linear polymers" are long chain, i. e. two-dimensional polymers, derived by artificial means from bifunctional reactants. Crystalline synthetic linear polymers containing amide groups as an integral part of the chain, with which polymers this invention is particularly concerned, are of two types: those derived from polymerizable monoaminomonocarboxylic acids and their amide-forming derivatives, e. g. caprolactam, and those derived from the reaction of suitable diamines with suitable dicarboxylic acids or amide-forming derivatives of dibasic carboxylic acids. Instead of the polymers mentioned above, which are obtainable from bifunctional polyamide-forming reactants as essentially sole reactants, I may use the linear polyamides obtained by including with the polyamide-forming reactants used to prepare the polyamide, other bifunctional reactants, such as glycols and hydroxy acids. As examples of such modified polyamides may be mentioned those derived from diamines, dibasic acids, and glycols; those derived from diamines, dibasic acids, and hydroxy acids; those derived from amino acids, dibasic acids, and glycols; and those derived from amino acids and hydroxyacids. Although these products contain ester linkages, they can still be referred to as polyamides since they contain a plurality of amide linkages and retain many of the desirable properties of the straight polyamides. Like the straight polyamides, these modified polyamides do not exhibit fiber-forming properties until their intrinsic viscosity is at least 0.4.

For the preparation of articles molded according to this invention, crystalline synthetic linear polymers should be selected which have a high degree of polymerization. As polyamides do not exhibit fiber-forming properties until their intrinsic viscosities are at least 0.4 and fiber-forming properties go hand in hand with the properties of tensile strength, toughness, and durability desirable in molded articles, polyamides for use according to this invention should be chosen with intrinsic viscosities above 1.0.

Intrinsic viscosity (a measure of the molecular weight) is defined as $$\frac{\log_e \eta_r}{C}$$

where $\eta_r$ is the viscosity of a dilute meta-cresol solution of the polymer divided by the viscosity of meta-cresol in the same units and at the same temperature, and C is the concentration in grams of polymer per 100 cc. of solution. The strength and toughness of the polymers increase with the intrinsic viscosity.

For the most part synthetic linear polymers derived from straight chain reactants are characterized by high sharp melting points, generally above 150° C. and often above 225° C., are microcrystalline in character as shown by X-ray diffraction patterns characteristic of crystalline materials, and have good resistance to the solvent action of water and of most organic solvents. These properties of the polymers, which are in sharp contrast to those of the common plastics, together with their high strength (8,000-14,000 lbs./sq. in. in unoriented sheet form on original dimensions) and lightness (density 1.0-1.2) make them very useful in the preparation of a wide variety of molded articles.

In its preferred embodiment, the invention consists in liquefying polymer by heat, supplying it to the nozzle of an automatic molding machine in an inert atmosphere as, for example, carbon dioxide or nitrogen, and, through the application of suitable pressure upon the melt, causing the polymer to be injected into a mold maintained at a temperature below the melting point of the polymer, allowing the polymer to solidify within the mold, ejecting the formed article and repeating the cycle. It is advantageous in carrying out the process to first extrude the molten polymer in the form of a ribbon, sheet, rod or the like, and rapidly chill the same, preferably by quenching in water. This form of the polymer is readily powdered or broken into small pieces on conventional machines. The resulting granular product is then in a convenient state of subdivision for being fed to a melting chamber.

The following example illustrates the invention in greater detail. Parts are by weight.

*Example I*

Polyhexamethylene adipamide containing 30% diamylphenol was prepared in the usual manner by heating together in an autoclave 786 parts of hexamethylenediammonium adipate with 300 parts of diamylphenol in the absence of oxygen. The resulting composition was removed from the reaction chamber by extrusion through a small slit into cold water and the ribbon (M. P. 245° C.) thus formed cut in small pieces and ground in a hammer mill to pass a $\frac{3}{32}''$ screen. A sample of this polymer, when freed of the plasticizer by methyl alcohol extraction, was found to possess an intrinsic viscosity of 1.07. The major portion of the product was fed into the melt chamber of an injection molding machine maintained at a wall temperature of 300° C. Air was continuously swept out of the chamber with carbon dioxide gas. Operation with a comb die heated with steam at one atmosphere pressure yielded well formed combs of unusual toughness.

The foregoing example illustrates the preparation of shaped articles by die-casting or injection molding high molecular weight members of the class of crystalline synthetic linear polyamides containing amide groups as an integral part of the chain. A valuable class of polymers of this general type for use in this invention are those derived from diamines of the formula $NH_2CH_2RCH_2NH_2$ and dicarboxylic acids of the formula $HOOCCH_2R'CH_2COOH$ or amide-forming derivatives thereof in which R and R' are divalent hydrocarbon radicals free from olefinic or acetylenic unsaturation and in which R has a chain length of at least two carbon atoms. An especially valuable group of these polyamides within this class are those in which R is $(CH_2)_x$ and R' is $(CH_2)_y$ where $x$ and $y$ are positive integers and at least 2. Outstanding in this latter class are polyamides derived from hexamethylenediamine and adipic acid, decamethylenediamine and sebacic acid, and interpolymers derived from various combinations of molecularly equivalent quantities of these diamines and dibasic acids respectively. Such polyamides yield molded articles of greater strength and less pliability than those containing ester groupings in the linear chain, as described below.

However, polyamides of other types are also useful, e. g. the polyamide derived from $\delta,\delta$-diaminodipropyl ether and adipic acid. Furthermore, polyamides derived from polymerizable monoaminomonocarboxylic acids or their amide-forming derivatives, e. g. caprolactam, can be used as molding compositions. Mixtures of preformed polyamides may also be used.

In addition to the above, crystalline synthetic linear polymers designated as polyester-polyamide interpolymers may be used according to this invention. As shown in Example V describing the preparation and molding of 70% polyethylene adipate-30% polyhexamethylene adipamide interpolymer, articles of greater pliability are produced.

Aside from the modifications in polymer compositions stated above, it is also possible to vary the properties of the molded articles by the incorporation of plasticizers or fillers by procedures similar to those described in the examples. Among the former may be especially mentioned sulfonamides such as N-alkylated toluene sulfonamides, phenols such as diphenylolpropane, diamyl phenol and tertiary amyl phenol, and cyclic ketones such as camphor.

Fillers are used for their stiffening action in the shaped articles as well as for the purpose of lowering the unit cost of the molding composition. Fillers may be incorporated either through addition to the polymer-forming reactants, followed by polymerization, or into the preformed polymer by any of the known methods for incorporating fillers into the common plastics. The choice of filler is principally determined by its greater or lesser tendency to embrittle the polymer while contributing stiffness to the molded articles, the ease and degree with which it may be dispersed in the polymer, and finally, by its stability at the temperature required to melt the resulting composition. For example, wood flour, a filler widely used in Bakelite resins, is not suitable for use in a composition containing a crystalline synthetic linear polymer melting above 180°-200° C. However, inert inorganic fillers, such as talc, kieselguhr, asbestos, or mica, may be employed with polyhexamethylene adipamide, which composition will require a temperature above 250° C. for fusion. In general the use of molding compositions containing crystalline synthetic linear polymers together with other materials, among which may be fillers or resins, are considered within the scope of this invention.

When molding according to this invention, it is preferable to avoid the presence of oxygen in contact with the molten or melting charge. This is accomplished by blanketing the charge with an inert (non-oxidizing) gas such as carbon dioxide, nitrogen, or steam. Otherwise, darkening or discoloration of the polymer due to oxidative degradation will result. This precaution is of particular significance when molding the higher melting polyamides.

The physical form, whether flake, chip, or powder, in which the polymers are fed to the melting chamber, is determined solely by the ease of handling, minimum time necessary for melting, and the elasticity of the polymer. Thus, finely powdered polymer is light and fluffy and consequently difficult to handle satisfactorily, while extremely coarse materials melt rather slowly in the chamber. Highly elastic polymer cannot be ground or pulverized in the usual sense, but must be cut into suitably small pieces.

Methods of die-casting polyamides consisting in supplying molten polymer to the nozzle of an injection molding or die-casting machine equipped with a valve, from a reservoir of molten stock, are especially useful. This principle of die-casting is illustrated in Fig. 2 and Example I in which the so-called reservoir is alternatively used as a reaction chamber for preparing the polymer and as a source of liquid polymer during the operation of the molding machine. It is likewise possible to operate continuously in the sense that the polymer, as it is prepared, is continuously fed either into the melt chamber, or directly to the nozzle of an injection or die-casting machine, or into a reservoir supplying the melt chamber or nozzle of such a machine. Another method of producing molten polymer consists in the use of a suitably heated melting grid employed to melt solid polymer or to remelt polymer waste from the molding operations, such as defective articles, sprues, gates or runners; the molten polymer thus formed is then ultimately supplied to the nozzle of the injecting machine in any of the various ways described above. Apparatus such as that shown in Fig. 1, described hereinabove, may be employed in this type of procedure.

Such time-saving processes as outlined above are not adaptable to the common molding plastics due to the methods of preparing these materials as well as their thermal instability at elevated temperatures. However, polyamides are outstanding in this latter characteristic and hence are well suited to these procedures. For example, polyhexamethylene adipamide may be heated for several hours at 272° C. in the absence of oxygen with no decomposition.

The temperature range over which successful injection molding may take place for any given polymer composition is rather narrow and is determined by the properties of the specific compositions concerned. Customarily, in practice, the optimum temperature range is rather easily determined after several injections at selected temperatures. For example, a composition containing 17% of a mixture of N-ethyl-o- and p-toluene sulfonamide, 13% p-tertiary amyl-phenol, and 70% polyhexamethylene adipamide was successfully injection molded at a cylinder wall temperature of 246° C., while the use of higher temperatures (254° C.) caused the molten stock to run rapidly out of the nozzle, and at lower temperatures (232° C.), other factors remaining unchanged no flow was produced. This is readily understood when the crystallinity of the product is considered. As emphasized previously, one of the principal characteristics of a crystalline material, as compared to a plastic, is its possession of a sharp melting point.

Although not absolutely necessary, it has been found convenient to coat the surface of the mold with a lubricant during the molding of polyamides according to this invention, in order to avoid sticking of the molded article and subsequent difficulty of ejection. Among mold lubricants which are useful for this purpose may be mentioned long-chain fatty alcohols, aryl phosphates or phosphites and soap. In many cases, the same result may be accomplished by incorporating a lubricant substance directly into the polyamide composition to be molded.

The inherent rigidity of articles molded from polyamides increases subsequent to their injection-molding from melt. In the cases, e. g., of polyhexamethylene adipamide and polyhexamethylene sebacamide, of above 1.0 intrinsic viscosity, this increase is in excess of 40%. This property is especially apparent in articles molded from interpolyamides, for example, the interpolymer consisting of 50% of polyhexamethylene adipamide, 50% polydecamethylene sebacamide, and the interpolymer consisting of 70% polyethylene adipate, 30% polyhexamethylene adipamide. This delayed stiffening is useful, for example, when extremely intricate or otherwise delicate moldings are being produced, and damage might otherwise take place in ejecting the molded article from the die.

It is to be understood that the terms "injection molding" and "die casting," as used herein, comprise all the various ways for transferring a molten or plastic mass into a mold or die to form, when chilled and ejected, useful or ornamental shaped articles. Thus, processes commonly described as extrusion molding, involving the extrusion of a mass into a mold, a squirting process, or transfer molding, are considered to come under the scope of this invention.

It will be evident from the foregoing description that this invention provides a method for preparing useful or ornamental shaped articles from crystalline synthetic linear polymers. Although many articles may be prepared through the use of these polymers in a process of compression molding, or blanking out, such as combs, solid toilet ware, and the like, I have found that more rapid and continuous operation results when these polymers are shaped in injection molding or die casting equipment by the process described in this invention. In this manner the most intricate molded articles, such as covers for electric switches or other electric insulating articles for electric or wireless apparatus of any kind, vanity boxes, powder boxes, toilet articles such as combs, knobs, handles, buttons, or artificial jewelry, may be obtained in a very simple manner. By the process of this invention, it is possible to make transluscent, opaque or colored products. Pearl essence or other materials affecting the pattern or mottle of the products may be incorporated in the polyamide. In addition, it should be mentioned that polyamides in the molded form are useful as rods, tubes, printing rolls, stamping and printing dies, machine bearings, shoe box-toes, shoe heels, shoe counters, hookless fasteners, toys, unbreakable bottles, toilet articles, dentures, mouth pieces for pipes, printing plates, piano keys, billiard balls, ivory substitutes, gaskets, dishes, etc.

As many apparently widely different embodiments of this invention may be made without departing from the spirit and scope thereof, it is to be understood that I do not limit myself to the specific embodiments thereof except as defined in the appended claim.

I claim:

A process for obtaining highly tough and rigid articles composed of high molecular weight synthetic linear polymer, said process comprising heating above its melting point a polymer comprising polyhexamethylene adipamide which has been polymerized to an intrinsic viscosity above 1.0, and injecting the molten polymer under pressure into a closed mold.

WALLACE E. GORDON.